United States Patent [19]

Tillotson et al.

[11] Patent Number: 4,909,365

[45] Date of Patent: Mar. 20, 1990

[54] FREEWHEELING CLUTCH AND IMPLEMENT EMPLOYING SAME

[75] Inventors: Henry B. Tillotson, Minneapolis; David J. Scherbring, Shakopee, both of Minn.

[73] Assignee: The Toro Company, Minneapolis, Minn.

[21] Appl. No.: 205,429

[22] Filed: Jun. 16, 1988

Related U.S. Application Data

[63] Continuation-in-part of Ser. No. 69,130, Jul. 2, 1987, abandoned.

[51] Int. Cl.$^4$ .................... F16D 41/12; F16D 43/00
[52] U.S. Cl. ........................ 192/35; 56/11.6; 56/11.8; 192/39; 192/46; 192/50
[58] Field of Search .................. 192/35, 39, 29, 43.1, 192/46, 50; 56/11.3, 11.6, 11.8; 474/72, 101

[56] References Cited

U.S. PATENT DOCUMENTS

| | | |
|---|---|---|
| 967,006 | 8/1910 | Feile . |
| 1,396,343 | 11/1921 | Richardson . |
| 1,466,214 | 8/1923 | Thompson ............................ 192/50 |
| 2,366,912 | 1/1945 | Lauper ............................... 192/46 X |
| 2,531,819 | 11/1950 | Lewis .................................... 192/50 |
| 2,784,820 | 3/1957 | Clark ................................ 192/50 X |
| 2,838,124 | 6/1958 | Cramer ............................ 56/11.3 X |
| 2,998,871 | 9/1961 | Horn . |
| 3,300,003 | 1/1967 | Peterson et al. . |
| 3,463,280 | 8/1969 | Hoffman et al. . |
| 3,511,348 | 5/1970 | Jonsson et al. . |
| 3,720,294 | 3/1973 | Plamper . |
| 4,076,108 | 2/1978 | Fogelberg . |
| 4,089,387 | 5/1978 | Cook .................................. 192/50 X |
| 4,116,314 | 9/1978 | Ackerman . |
| 4,126,214 | 11/1978 | Kiss . |
| 4,327,539 | 5/1982 | Bricko et al. . |
| 4,554,780 | 11/1985 | Umeno et al. . |

FOREIGN PATENT DOCUMENTS

| | | |
|---|---|---|
| 77859 | 5/1983 | European Pat. Off. . |
| 139815 | 3/1903 | Fed. Rep. of Germany . |
| 3521145 | 12/1986 | Fed. Rep. of Germany . |
| 814072 | 6/1937 | France . |
| 138961 | 3/1930 | Switzerland . |
| 861920 | 3/1961 | United Kingdom . |
| 1135818 | 12/1968 | United Kingdom . |
| 2089911 | 6/1982 | United Kingdom . |

OTHER PUBLICATIONS

Toro Parts Catalog Form No. 3312-606, entitled: 21", S.P. Rear Bagger, The Toro Company-1985.

*Primary Examiner*—Rodney H. Bonck
*Attorney, Agent, or Firm*—R. Lawrence Buckley

[57] ABSTRACT

A bidirectional freewheeling clutch assembly (50) and a self-propelled walk-behind lawn mower (10) including same are disclosed. Lawn mower (10) preferably includes a prime mover (18) which can be selectively coupled to a gear box (34). The output shaft (44) of gear box (34) extends to a pair of clutch assemblies (50) which selectively apply torque to a pair of gear driven wheels (16). Each clutch assembly (50) includes as its basic components a key (68) and a friction disk (66). Key (68) has a wedge portion (74) which rocks within an axial first keyway (62), and a tang portion (76) which is received within a tang relief (84) in friction disk (66). When shaft (44) is rotated friction disk (66) frictionally engages the housing (12) of mower (10) and applies a drag force to the tang portion (76) of key (74) to cause it to cock and positively engage a pinion (46) which engages a gear (48) attached to drive wheel (16). When gear box output shaft (44) is not rotated key (68) is not cocked and pinion (46) and drive wheel (16) can bidirectionally freewheel.

14 Claims, 4 Drawing Sheets

FREEWHEELING CLUTCH AND IMPLEMENT EMPLOYING SAME

This is a continuation-in-part of Ser. No. 07/069,130, filed Jul. 2, 1987 and now abandoned.

TECHNICAL FIELD

The invention generally pertains to clutches. More particularly, the invention involves clutches which couple a driving member with a driven member in such a way that when the driving member is rotated it positively engages and propels the driven member, but when the driving member is not rotated, the driven member can freewheel in either direction.

BACKGROUND OF THE INVENTION

Clutches are well known mechanical components for selectively coupling a driving member with a driven member, wherein the "members" are typically coaxial rotating components. There are many different types of clutches, but virtually every clutch can be categorized either as a "positive" clutch or a "friction" clutch. When the driving and driven members of a clutch are interlocked by the mechanical engagement of teeth or lugs, the clutch is said to be positive. A common type of positive clutch includes a pawl which engages a ratchet. By contrast, friction clutches transmit torque frictionally, using simple rotating friction plates, pads, or the like.

Clutches can also be categorized depending on whether the driven member can overrun the driving member when the former rotates faster than the latter. Overrunning clutches, those which allow the driven member to rotate at a higher speed than the driving member, are useful in many applications, e.g., coupling starter motors to internal combustion engines.

Still another feature of some clutches is the ability to "freewheel." Although the terms overrunning and freewheeling are sometimes used interchangeably in describing clutches, in the present application the term freewheeling is specially defined. As used herein, a "freewheeling" driven member can rotate relative to a driving member when the latter is not being rotated in the normal drive direction(s).

To illustrate, the terminology discussed above can be applied to the traditional ratchet clutch. In one type of ratchet clutch, the driving and driven members each include teeth and the opposing toothed members are urged together by some type of spring. The driving member can be rotated in either direction but significant torque is transmitted to the driven member in one direction only. In the opposite direction the teeth slip over one another, thereby generating the well-known clicking sound associated with ratchet-style clutches. Thus, the traditional ratchet clutch can be categorized as a positive clutch which permits overrunning and which permits freewheeling in one direction only.

Having defined the relevant terms, the present invention and the prior art can now be succinctly discussed. One embodiment of the present invention is a positive clutch which provides bidirectional freewheeling, and which preferably provides for overrunning. The clutch is actuated or engaged using friction, but torque is not transmitted from the driving member to the driven member in traditional friction clutch manner, i.e., through the use of friction pads or the like.

Various designs for friction-actuated, positive, bidirectional freewheeling clutches have been proposed. For example, U.S. Pat. No. 3,463,280, issued to G. J. Hoffman et al., discloses a clutch assembly including a driving shaft, a driven hub, a housing, and a rocking pawl mounted on a rather delicate projection extending from a collar mounted on the driving shaft. The Hoffman pawl is "external" in the sense that it is not contained within a notch or slot in the driving member, but instead is carried externally thereto on a collar. When the driving member is rotated relative to the housing the "external" pawl cocks and engages teeth or notches in the driven hub. The pawl is cocked by a disk which frictionally engages the housing. The frictional drag on the pawl causes it to cock and engage the driven hub to thereby allow torque to be transmitted from the driving shaft, through the pawl, and to the driven hub. On the other hand, if the driving member is stationary, the driven member can freewheel in either direction since the pawl is not cocked in the absence of rotational movement of the driving shaft relative to the housing.

While the Hoffman clutch described above may be conceptually satisfactory, it possesses several shortcomings. For example, the delicate pawl carrier which extends from the collar mounted on the driving shaft may tend to fail when subjected to substantial loading on a regular basis. The rather slender pawl carrier must absorb and transmit all of the torque from the driving member to the driven member. Also, the Hoffman "external" pawl design is space-consuming in that it requires an additional collar connected to the shaft and a pawl carrier, and must accommodate external rocking or pivoting of the pawl relative to the driving member.

A design conceptually similar to the Hoffman clutch is disclosed in U.S. Pat. No. 967,006, issued to R. C. Feile. The Feile clutch assembly includes a driving axle, a driven wheel assembly, a pawl pivotally pinned to a friction disk, and a journal bearing in contact with a stationary housing which ultimately supports the entire assembly. The pawl includes a rather fragile lower extension which fits within a notched member extending from the driving shaft. The Feile clutch functions quite like the Hoffman clutch: When the driving shaft rotates the pawl is cocked by virtue of the drag on the friction disk. The cocked pawl engages an internal tooth on the wheel assembly.

The Feile clutch, like the Hoffman clutch, is conceptually suitable for some applications. However, it too includes a rather bulky "external" pawl, i.e., a pawl mounted externally to the driving shaft rather than internally within a notched or relieved area. Also, the lower projection on the pawl and the pawl pin are likely to wear, if not fail, over a long period of time. Finally, the Feile clutch includes an excessive number of parts.

One embodiment of the present invention is a friction-actuated, positive, bidirectional-freewheeling clutch which addresses the problems associated with functionally similar prior art clutches.

Another embodiment of the invention is a power implement employing such a clutch. One particularly advantageous application is in the traction drive system of a self-propelled lawn mower. A self-propelled walk-behind lawn mower typically includes a rotating blade mounted beneath a housing which is supported by a plurality of wheels. Mounted atop the housing is a prime mover (e.g., internal combustion engine) which can be selectively coupled to the blade and to one or more traction drive wheels. A traction drive clutch interconnects the prime mover and the drive wheel(s).

In a lawn mower drive system employed by Honda and at least partially disclosed in U.S. Pat. No. 4,554,780, issued to Umeno et al., a first drive shaft extends between the prime mover and a gear box. A "dog" clutch couples the output or "jack" shaft of the gear box to a second drive shaft which ultimately drives the traction wheels. A control wire attached to the dog clutch connects to a control lever mounted on the lawn mower's handle. The second drive shaft is connected to a pair of rear drive wheels through a pair of one-way ratchet clutches. When the dog clutch is engaged there is a direct and sudden mechanical connection between the prime mover and the rear drive wheels. This results in "jack rabbit" starts which can actually cause the lawn mower to rear back on its traction wheels like a high-powered dragster.

An improved lawn mower drive system has been employed by The Toro Company, assignee herein. In the Toro system, a smooth V-belt couples the prime mover to a gear box pivotally mounted on the mower's housing. The output shaft of the Toro gear box is connected through a pair of one-way clutches to a pair of rear drive wheels. The one-way clutches provide a simple differential to allow the drive wheels to rotate at different speeds during a turn. A clutching action between the prime mover and the traction wheels is achieved by virtue of the pivotal connection between the gear box and the housing: when it is desirable to engage the drive wheels the gear box is pivoted away from the prime mover through the use of a control wire/control lever assembly. The prime mover/traction wheels interconnection can be "feathered" by gradually increasing the distance between the prime mover pulley and the gear box pulley. Thus, with the Toro system, uncomfortable and potentially dangerous jack rabbit starts are eliminated.

While the Toro system has proven to be superior to the Honda system in terms of eliminating jack rabbit starts, the Honda system provides for easier freewheeling of the drive wheels. Freewheeling of the traction wheels is important because it allows the mower to be freely and easily moved in both directions during trimming operations (when the blade is rotated but the traction wheels are not) and during transportation of the mower. As discussed above, the Honda gear box jack shaft is connected to the gears through the use of a dog clutch. When the dog clutch is disengaged, the only drag on the drive wheels is that imposed by the ball bearings which carry the jack shaft. The drive wheels can thus smoothly and easily freewheel in either direction. In fact, the "pull back" force on some Honda mowers is only about 5 pounds when the dog clutch is disengaged.

By contrast, when the Toro V-belt type clutch is disengaged and the gear box is in neutral the pull back force on new Toro mowers is typically about 19 to 21 pounds. This larger pull back is primarily attributable to the fact that Toro employs 3-to-1 speed reduction gearing at the drive wheels. Also, to reduce costs and increase reliability, Toro uses bushings rather than ball bearings in the primary gear box. Of course, when the gear box is not in neutral the pull back force on the Toro mowers is even higher. Trimming operations are thus hindered and the drive wheels occasionally skid, rather than roll, over the grass.

The clutch of the present invention could be situated between the gear box output shaft and the traction wheels of a mower like the Toro mower described above, so that when the output shaft is driven by the prime mover the wheels are also driven, and so that when the output shaft is no longer driven by the prime mover the traction wheels can readily freewheel in either direction relative to the drive shaft.

Therefore, the present invention, in addition to being directed toward a simple, compact bidirectional-freewheeling clutch, is also directed toward a powered implement employing such a clutch. In a preferred embodiment of such an implement, a pair of such clutches is situated between a driving shaft of a lawn mower and a pair of drive wheels so that freewheeling of the drive wheels is permitted when the driving shaft is not being rotated by the prime mover.

SUMMARY OF THE INVENTION

Accordingly, one aspect of the invention is directed toward a bidirectional freewheeling clutch suitable for operatively coupling a driven member with a driving member, wherein the driven and driving members are configured to rotate relative to a housing. The clutch preferably includes (i) an internal key having a wedge portion and a tang portion extending therefrom, and a retracted (or uncocked) state and an extended (or cocked) state relative to the driving member; and (ii) a friction disk concentric to the driving member and in frictional contact with the "housing," the disk forming a relief suitable for receiving the tang portion of the key. The driving member forms a first axial keyway suitable for wholly receiving the wedge portion of the key when it is in its retracted or uncocked state and partially receiving the wedge portion of the key when it is in its extended or cocked state. The driven member forms a second keyway suitable for partially receiving the wedge portion of the key when it is in its extended state. During operation, when the driving member is rotated in a first direction relative to the "housing," the friction disk in frictional contact with the "housing" applies a drag force on the tang portion to urge the key from its retracted state wherein the wedge portion is wholly within the first keyway to its extended state wherein a portion of the wedge portion is in the second keyway and torque is transmitted between the driving and driven members. On the other hand, when the driving member is not rotated in the first direction relative to the "housing" the driven member can engage the wedge portion to wipe the key into its retracted state thereby eliminating torque transfer between the driving and driven members and allowing bidirectional freewheeling of the driven member relative to the driving member.

The "housing" can be any element which is substantially stationary relative to the driving and driven members. In the case of a lawn mower, the "housing" can actually be the blade housing or any part or assembly connected thereto, e.g., a traction wheel pivot housing.

In a preferred embodiment, the wedge portion of the key floats within and between the first and second keyways and the tang portion of the key floats within the tang relief. As the term "floats" is used herein, it means that the key is not pinned, screwed, riveted, or otherwise connected to any of the other components of the freewheeling clutch assembly.

The wedge portion of the key preferably has a relatively thick leading edge which is contained within the first keyway when the key is in its retracted state and which is partially contained within the second keyway when the key is in its extended state; and a relatively thin trailing edge within the first keyway upon which the key rocks when acted upon by the friction disk or the driven member.

Another aspect of the invention is a traction drive system for a powered implement, the traction drive system being of the type which includes a pivoting gear box having an input shaft and a gear box output shaft suitable for coupling to a traction drive wheel assembly; prime mover and gear box pulleys; and a belt for selectively interconnecting the pulleys when the gear box is appropriately pivoted. The improvement in the traction drive system resides in the incorporation of a bidirectional freewheeling clutch suitable for operatively coupling the gear box output shaft and the drive wheel assembly, wherein when the gear box is appropriately pivoted and the gear box output shaft is caused to rotate, the clutch is activated by frictional contact with the implement housing (or assembly connected thereto), thereby allowing torque to transfer between the gear box output shaft and the drive wheel assembly; whereas when the gear box output shaft is not rotated there is no appreciable torque transfer between the drive wheel assembly and the gear box output shaft and the drive wheel assembly can freewheel in either direction.

Preferably, the traction drive system bidirectional freewheeling clutch includes an internal key and a friction disk as described above.

Finally, a most preferred embodiment of the invention is a self-propelled walk-behind lawn mower including a pair of bidirectional freewheeling clutches situated between the gear box of the mower and a pair of traction drive wheel assemblies. When preferred freewheeling clutches are used on the assignee's mowers, pull back force is reduced from upwards of 20 pounds to about 4 pounds. The ability to "feather" the drive system is retained, however, by continuing to use a belt drive between the prime mover and the gear box.

BRIEF DESCRIPTION OF THE DRAWINGS

A preferred embodiment of the invention is depicted in the Drawings, wherein.

DETAILED DESCRIPTION OF PREFERRED EMBODIMENT

Mower 10

Figure 1:
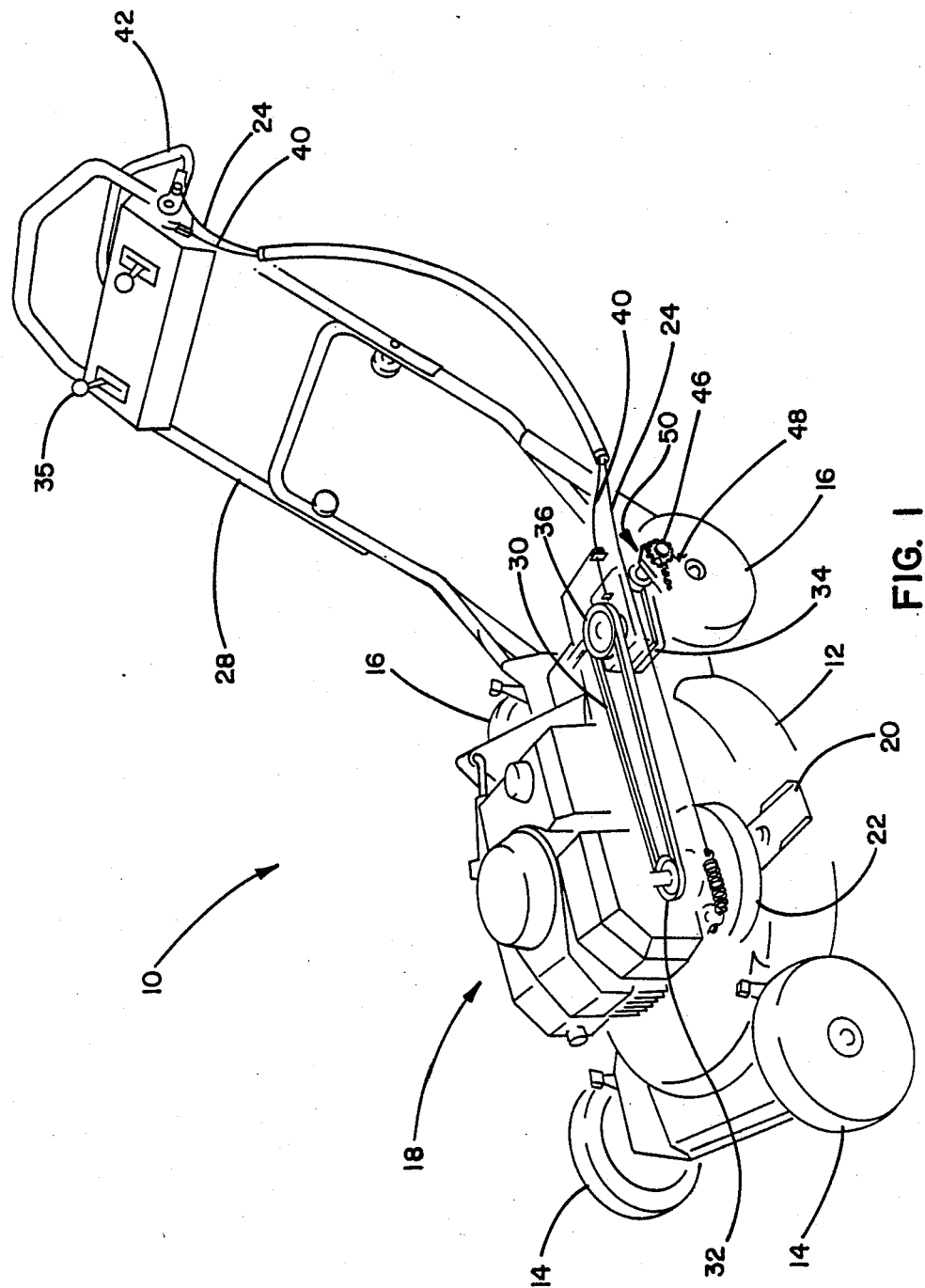
FIG. 1 is a perspective view of a lawn mower according to the invention.

Referring to the Drawings, wherein like reference numerals designate like parts and assemblies throughout the several views, FIG. 1 shows a perspective view of a lawn mower 10 which represents one preferred embodiment of the invention. It should be noted that the clutch of the present invention, a preferred embodiment of which is described below, could be used with a wide variety of power implements, including various types of lawn mowers and snow throwers; mower 10 merely exemplifies the invention.

Mower 10 is a self-propelled, walk-behind rotary mower having a blade housing 12 carried by two front wheels 14 and two rear drive wheels 16. Mounted atop housing 12 is a "prime mover" 18, which is a gasoline engine in the embodiment depicted in the Drawings but could alternatively be an electric motor. Engine 18 is coupled to a rotary blade 20 through a blade brake/clutch (BBC) 22 which is actuated by a BBC control wire 24 connected to a bale 42 pivotally connected to a mower handle 28.

Since mower 10 is a "self-propelled" implement, engine 18 can also be selectively coupled to drive wheels 16. In the preferred embodiment, this connection is partially made with a V-belt 30 which is coupled to prime mover 18 through a prime mover pulley 32, and is similarly coupled to a gear box 34 through the use of a gear box pulley 36. Gear box 34 includes a gear changing mechanism which is connected to a gear shift lever 35. The operator can choose one of several forward drive speeds, or neutral, as the need arises.

Gear box 34 is preferably pivotally attached to blade housing 12 such that the tension in V-belt 30 can be changed by varying the distance between pulleys 32 and 36. Pivoting of gear box 34 is effected by a traction drive control wire 40 which is connected in standard fashion to the bale 42 located toward the top of handle 28. Thus, when bale 42 is properly engaged, control wire 40 draws gear box pulley 36 away from prime mover pulley 32 thereby increasing the tension in V-belt 30 and causing power to transmit from prime mover 18 to gear box 34. The unique manner in which the single bale 42 can control two clutches (BBC 22 and gear box clutch including V-belt 30) is described in U.S. Pat. No. 4,327,539, incorporated herein by reference.

Figure 2:
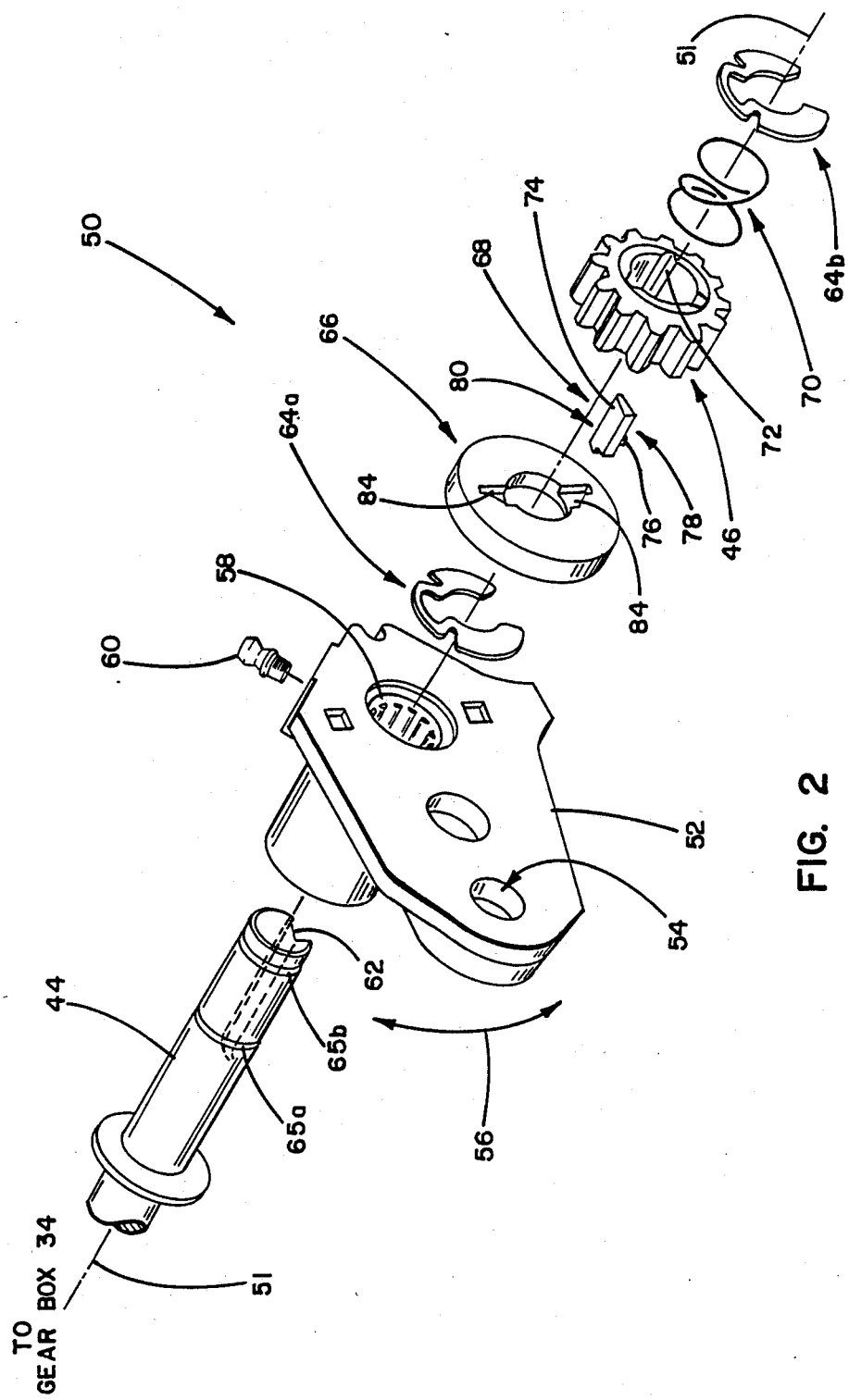
FIG. 2 is an exploded perspective view of the clutch assembly of the mower of FIG. 1.

An output shaft (or jack shaft) 44, shown in FIG. 2, extends laterally from gear box 34 toward drive wheels 16 where it is connected through a pair of unique clutch assemblies 50 to a pair of drive pinions 46. Clutches 50 provide a simple differential to allow the drive wheels 16 to rotate at different speeds during a turn. They also provide for easy bidirectional freewheeling of wheels 16 when shaft 44 is not being driven by gear box 34. Clutch assemblies 50 are described in some detail below.

Drive pinions 46 mesh with larger wheel gears 48 which are coaxially fixed to drive wheels 16. Assuming that gear box 34 is in gear, when bale 42 is properly manipulated gear box output shaft 44 is rotated by gear box 34 which in turn rotates pinions 46, wheel gears 48, and drive wheels 16.

Clutch Assemblies 50

As noted above, mower 10 preferably includes a pair of clutch assemblies 50 which act to transmit power from output shaft 44 to pinions 46 when output shaft 44 is rotated by gear box 34; but which allow drive wheels 16 to bidirectionally freewheel when output shaft 44 is not being rotated by gear box 34. An exploded view of one of the clutch assemblies 50 is shown in FIG. 2 and enlarged elevational views of clutch assembly 50 are shown in the remaining figures. The remainder of this discussion will focus on describing one of the clutch assemblies 50.

Referring to FIG. 2, clutch assembly 50 includes as two of its most important components output shaft 44 (the clutch "driving member") and pinion 46 (the clutch "driven member"). As described above, clutch assembly 50 functions to transmit torque from gear box output shaft 44 to pinion 46 if and only if output shaft 44 is being positively rotated by gear box 34.

As shown in FIG. 2, the components of clutch assembly 50 are coaxially aligned along pinion axis 51. Output shaft 44 is rotatably supported by a pivot housing 52 which in turn is connected to blade housing 12 such that it can pivot about pinion axis 51. Pivot housing 52 forms a wheel bolt aperture 54 suitable for receiving a shoulder bolt 90 (see FIGS. 3 and 4) or the like which rotatably carries one of the drive wheels 16. Pivot housings 52 pivot so that drive wheels 16 (along with front wheels 14) can be raised or lowered relative to blade housing 12 to change the mower's height of cut. Arrow 56 in FIG. 2 illustrates the manner in which pivot housing 52 pivots about pinion axis 51. As noted above, drive wheels 16 carry wheel gears 48 which mesh with pinions 46. Each wheel gear 48 is fixed to its associated drive wheel 16 by a plurality of screws 91, one of which is shown in section in FIGS. 3 and 4. The relationship between wheel gears 48 and corresponding pinions 46 clearly does not change when pivot housing 52 is adjusted to change the height of cut. It should be noted that pivot housings 52 and associated parts are included in lawn mowers presently manufactured and distributed by The Toro Co., assignee herein. For example, Toro's 21" self-propelled rear bagging lawn mower, illustrated in Toro Parts Catalog Form No. 3312-606, includes such assemblies. Form No. 3312-606 is incorporated herein by reference.

As noted above, output shaft 44 is rotatably carried by pivot housing 52. A roller bearing 58, shown in FIG. 2, reduces the frictional load on output shaft 44. A grease fitting 60 is also included. Roller bearing 58 can thereby be lubricated without disassembling clutch assembly 50. Pivot housing 52 also internally carries a bronze bushing and shaft seal (not shown) which cooperate with roller bearing 58 to substantially frictionlessly couple output shaft 44 to pivot housing 52.

Output shaft 44, preferably ½" O.D., forms a first axial keyway 62, the configuration and function of which will be described below.

Adjacent the outer surface of pivot housing 52 and carried on output shaft 44 is a pair of retainer clips 64a and 64b. Clips 64 are received by a pair of axially-spaced circumferential grooves 65 in output shaft 44. Located between clips 64 are pinion 46; a friction disk 66; key 68; and thrust spring 70. Each of these components is described below.

Pinion 46 is preferably a powdered metal gear having a standard 20° full depth involute gear tooth configuration on its radially outer surface. The radially inner surface of pinion 46 preferably forms a plurality of circumferentially-spaced second keyways 72. Second keyways 72 are preferably in the nature of triangular notches which extend axially along the entire length of pinion 46, and which are equally spaced along the inner periphery of pinion 46 at 120° intervals. As further described below, second keyways 72 are sized and configured to partially receive key 68 when the latter is cocked or extended.

Key 68 is also preferably made of powdered metal. It includes a wedge portion 74 substantially in the shape of first keyway 62 formed in output shaft 44. Key 68 also preferably includes a tang portion 76 which extends radially outward from wedge portion 74 and is substantially perpendicular thereto. Key 68, pinion 46 and friction disk 66 preferably consist of powdered iron and small quantities of nickel and carbon, the combination of which is heat treatable. Of course, the components of clutch assembly 50 could be formed in various ways and it is not necessary that they be made using powdered metal technology.

As shown better in FIGS. 3-6, key 68 includes a relatively thick leading edge 78 which can be about ⅛" thick and a relatively thin trailing edge 80 which can be approximately 1/16" thick. In the axial direction, wedge portion 74 is preferably about ½" long, corresponding roughly to the axial length of pinion 46. Key 68 is about ¼" wide, from leading edge 78 to trailing edge 80.

Tang portion 76 is preferably about 0.3" long. In the axial direction, tang portion 76 is about 0.1" wide; in the other direction, at its radially outermost extent, tang 76 preferably measures about 1/16". Tang 76 has a leading edge 77 which is somewhat concave; and a trailing edge 79 which is somewhat convex.

Figure 5:
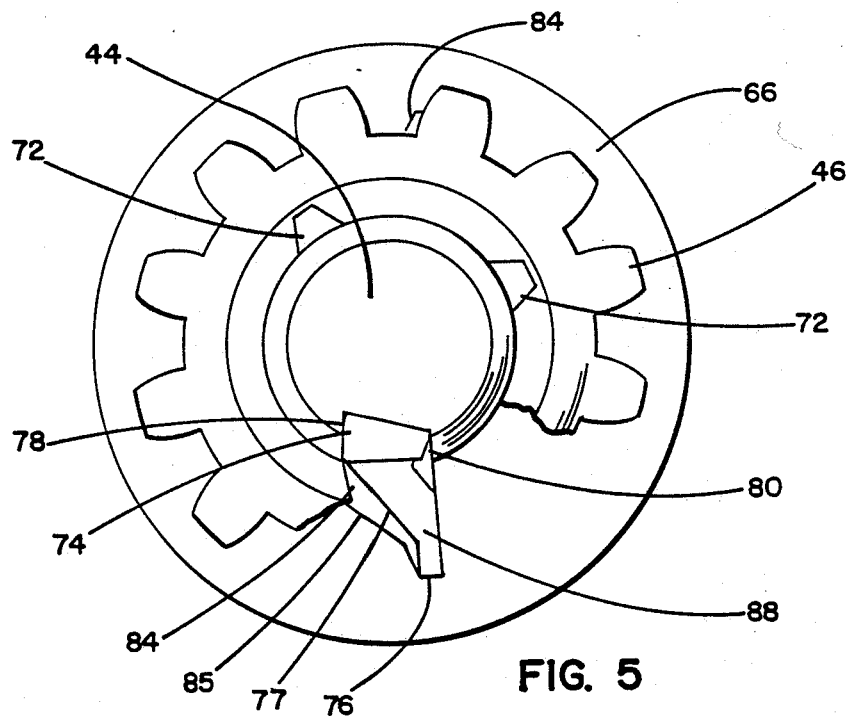
FIG. 5 is a further enlarged view of the clutch assembly of FIG. 2 with the clutch key in its retracted position.
Figure 6:
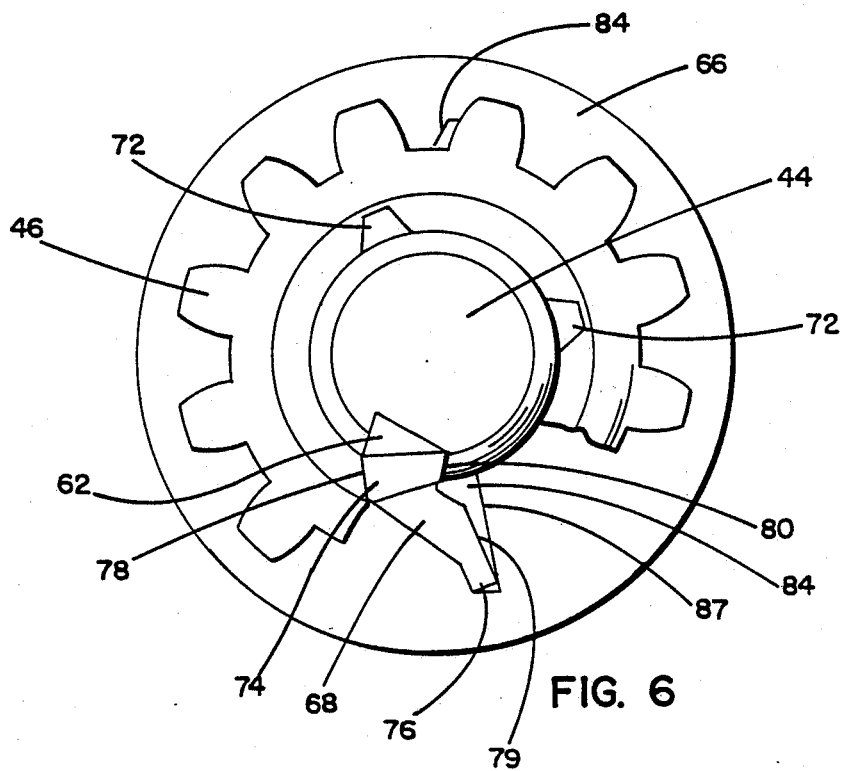
FIG. 6 is a further enlarged view of the clutch assembly of FIG. 2 with the clutch key in its extended position.

Friction disk 66 is in the nature of a circular disk or plate which is apertured to slidably receive output shaft 44. Disk 66 is preferably formed of plastic, e.g., acetal, although it could also be made of powdered metal. The front side of friction disk 66 forms a pair of tang reliefs 84 which are sized to receive tang portions 76 of keys 68. Specifically, as shown in FIGS. 5 and 6, tang reliefs 84 are substantially the same radial length as tang portion 76. And, reliefs 84 each include a leading edge 85 which is somewhat convex and shaped to conform to the leading edge 77 of tang 76; and a trailing edge 87 which roughly conforms to the trailing edge 79 of tang 76. However, the width in the circumferential direction of tang reliefs 84 is substantially greater than the width of tang portions 76 so as to allow rocking or pivoting of tang portions 76 relative to friction disks 66, for reasons set forth below. It should be noted that friction disks 66 each include "right" and "left" tang reliefs 84 so that a given friction disk 66 can be used on either the right or left side of mower 10.

The wedge portion 74 of key 68 "floats" within and between first and second keyways 62 and 72, respectively, and tang portion 76 "floats" within tang relief 84. That is, key 68 is preferably not pinned, screwed, riveted or otherwise attached to any of the other components of clutch assembly 50, but instead is operatively confined within the other components. This reduces the number of parts and cost of clutch assembly 50, simplifies assembly and maintenance, and eliminates the wear and lubrication problems associated with "non-floating" pawls or keys found in prior art clutches.

Also, key 68 is "internal" to driving shaft 44 in that its wedge portion can reside completely within first keyway 62. This is in contrast to "external" keys or pawls such as the Hoffman pawl shown in U.S. Pat. No. 3,463,280.

Completing clutch assembly 50 is thrust spring 70. Thrust spring 70, a compression spring, acts at its outer end on outer retainer clip 64b and on its inner end on the outer surface of pinion 46. This urges pinion 46 toward friction disk 66 which in turn is pushed against the outer surface of pivot housing 52. The inner surface (not shown) of friction disk 66 is relieved to receive inner retainer clip 64a. Thus, the inner surface of friction disk 66, at least at its radially outer periphery, contacts pivot housing 52 rather than inner retainer clip 64a. Pinion 46 is crowned on its inner and outer axial surfaces such that it can rotate freely relative to friction disk 66 even when the two components are urged together through the action of thrust spring 70. Pinion 46 is crowned so that the circular contact surface between pinion 46 and friction disk 66 has a smaller radius than the circular contact surface between friction disk 66 and pivot housing 52. Thus, even if the pinion/friction disk coefficient of friction is or becomes roughly equal to the disk/housing coefficient of friction, the torque created by the housing/friction disk interface should prevent cocking of key 68 during freewheeling of pinion 46. That is, the friction-generated torque on disk 66 due to the frictional contact between disk 66 and housing 52 should exceed the friction-generated torque on disk 66 due to disk/pinion rubbing.

It should be noted that housing-generated frictional torque on disk 66 can be enhanced, in some situations, by adding a rubber washer (not shown) or the like between disk 66 and housing 52, in which case element 66 as shown and described herein would not be in direct contact with pivot housing 52. Instead, element 66 would bear on the rubber washer (not shown) which in turn would bear on pivot housing 52. To reflect the fact that the invention contemplates both techniques, and equivalents thereto, the appended claims refer to a "friction disk means" which would preferably include an element in the nature of disk 66 and which may or may not include a friction enhancer such as a rubber washer between disk 66 and housing 52. It has been found that a 60 durometer rubber washer between an aluminum housing 52 and acetal disk 66 functions quite well, but it should again be noted that use of a rubber washer would not be necessary in all situations. Moreover, if a "friction enhancer" is employed it may be desirable to use a washer, for example, made of a material other than rubber. For example, a plastic or even a metal washer may enhance the frictional contact between element 66 and housing 52, or more generally, between the tang portion of key 68 and the housing.

In a broader sense, the clutch according to the present invention is actuated by frictional contact between a "friction disk means" and a "housing," but those skilled in the art will recognize that key 68 itself could comprise the friction disk means. That is, tang portion 76 could directly frictionally engage a "housing," and cause appropriate rocking of key 68, in which case the "friction disk means" would be a surface on the tang portion of the key which engages a "housing," either directly or indirectly through a friction enhancer such as a rubber washer. The "housing" which induces drag on the "friction disk means" can be any surface or part which is more or less rotationally stationary relative to the rotating driving and driven members. Any such surface or part will suffice, the term "housing" not necessarily being limited to pivot housing 52 or even blade housing 12.

Operation

Figure 3:
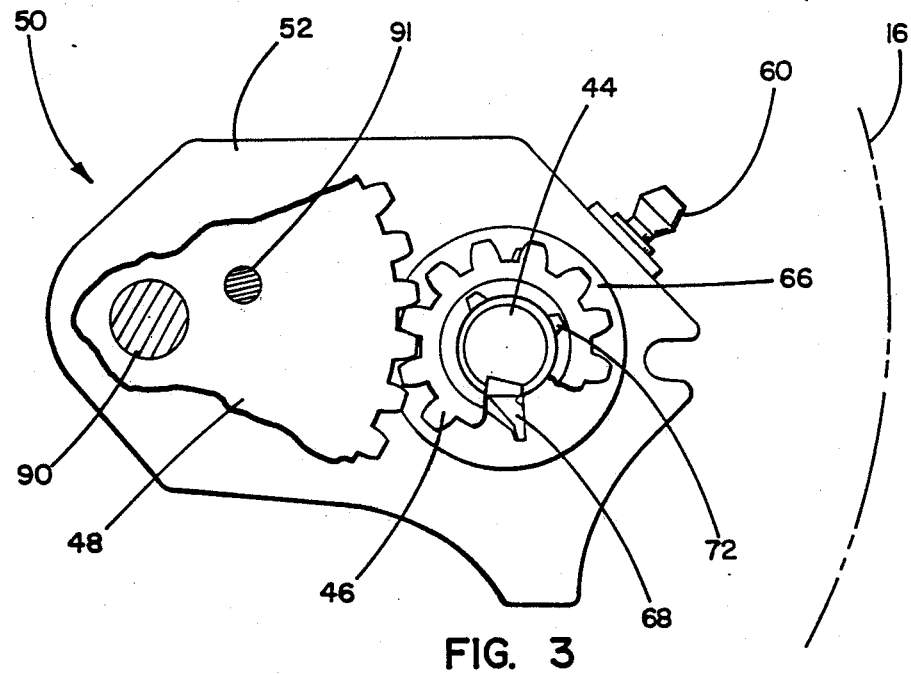
FIG. 3 is an enlarged elevational view of the clutch assembly of FIG. 2 with the clutch key in its retracted position.
Figure 4:
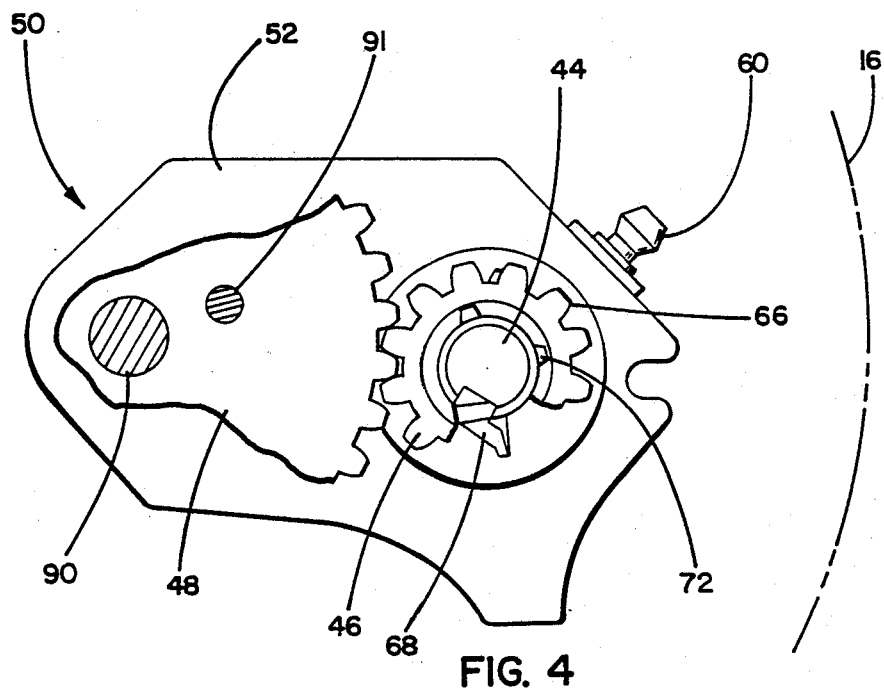
FIG. 4 is an enlarged elevational view of the clutch assembly of FIG. 2 with the clutch key in its extended position.

FIGS. 3-6 show enlarged elevational views of clutch assembly 50 in two states. FIGS. 3 and 5 show the state of clutch assembly 50 when output shaft 44 is not being rotated by gear box 34 and key 68 is in its retracted or uncocked position. FIGS. 4 and 6 illustrate the state of clutch assembly 50 when driver shaft 44 is being rotated clockwise (as shown in FIGS. 4 and 6) and key 68 is in its extended or cocked position. Note that outer retainer clip 64b and spring 70 are not shown for the sake of clarity in FIGS. 3-6. Note also that pinion 46 is broken away in FIGS. 3-6 to show the retracted and extended states of key 68. If pinion 46 was not so illustrated, only the most radially outward tip of tang portion 76 would be visible between a pair of pinion gear teeth.

When output shaft 44 is rotated by gear box 34, it of course rotatively carries key 68. Friction between shaft 44 and friction disk 66 is less than the frictional load between friction disk 66 and pivot housing 52. Thus, assuming shaft 44 is being rotated clockwise, the drag on friction disk 66 causes it to act on tang portion 76 of key 68 to tend to rock key 68 in a counterclockwise direction on its upper right hand corner, as viewed in FIGS. 3-6. With friction disk 66 urging against tang 76 in this fashion, once key 68 reaches one of the second keyways 72 (i.e., when first and second keyways 62 and 72, respectively, are aligned), key 68 will rock or tip on the upper right hand corner of its wedge portion 74 such that its wedge portion leading edge 78 rotates counterclockwise and upward into the aligned second keyway 72. At that point, torque is positively transmitted between the output shaft 44 and pinion 46 which in turn drives wheel gear 48 and drive wheel 16. It should be noted that the leading and trailing edges 78 and 80, respectively, of wedge portion 74 are configured such that they are flush with their respective contact surfaces in the first and second keyways 62 and 72 when key 68 is extended. The flush contacts minimize stress and wear, and render key 68 stable in its cocked position while at the same time allowing it to be "wiped down" to allow freewheeling, as further described below.

It should also be noted that key 68 will cock if and only if: (i) shaft 44 is rotated in the appropriate direction by gear box 34; and (ii) the frictional load on the rear face of friction disk 66 imparted by housing 52 exceeds the frictional load between friction disk 66 and shaft 44. This "differential friction" will cause relative motion between shaft 44 and disk 66 which will cock key 68. Inertial effects may also contribute to motion of key 68, but friction is thought to be the primary cause of the key cocking action.

Once shaft 44 is no longer being rotated by gear box 34, pinion 46 must be allowed to "wipe" key 68 down into first keyway 62 and thereafter freewheel in either direction without recocking key 68. Pinion 46 will wipe key 68 into its retracted position when it is rotated slightly in the clockwise direction as viewed in FIGS. 3-6. In a preferred embodiment, key 68 is completely wiped down upon roughly a 48° clockwise rotation of pinion 46, which corresponds to less than an inch of mower travel. That is, to "wipe" key 46 into its uncocked position it is necessary to disengage the gear box clutch and then manually push the mower forward about one inch (unless the momentum of the mower is sufficient to carry it this far). Such movement causes the radially inner surface of pinion 46 to push radially inward on the top of wedge portion 74 to rotate key 68 in a clockwise direction until wedge portion 74 is once again wholly contained within keyway 62. Thereafter, pinion 46 can freewheel in either direction, until shaft 44 is again rotated in the clockwise direction. During freewheeling, there mustn't be sufficient friction between pinion 46 and friction disk 66 to cause disk 66 to move relative to shaft 44, which would of course cock key 68 if in the appropriate direction. This is the reason for the front and rear face crowning of pinion 46: to minimize the contact area between pinion 46 and friction disk 66, and to position the pinion/friction disk area radially inward relative to the friction disk/pivot housing contact area. The torque generated by the small radius, small contact area pinion/friction disk interface is considerably smaller than the torque placed on disk 66 by its interaction with housing 52.

Finally, it will be noted that clutch assemblies 50 not only permit bidirectional freewheeling when shaft 44 is motionless, they also permit unidirectional overrunning when shaft 44 is driven by gear box 34. As viewed in FIGS. 3–6, pinions 46 can always rotate clockwise relative to shaft 44. Thus, one of the drive wheels 16 can rotate faster than the other drive wheel 16, resulting in a simple but effective differential. Turns can therefore be negotiated without annoying wheel sliding.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

We claim:

1. A bidirectional freewheeling clutch suitable for operatively coupling a driven member with a driving member, wherein the driven and driving members are configured to rotate relative to a housing, the clutch comprising:
   (a) an internal key having a wedge portion and a tang portion extending therefrom, and a retracted state and an extended state relative to the driving member; and
   (b) friction disk means concentric to the driving member and in frictional contact with the housing for operatively engaging the tang portion of the key, wherein:
      (i) the driving member forms a first axial keyway suitable for wholly receiving the wedge portion of the key when it is in its retracted state and partially receiving the wedge portion of the key when it is in its extended state; and
      (ii) the driven member forms a second keyway suitable for partially receiving the wedge portion of the key when it is in its extended state; whereby when the driving member is rotated in a first direction relative to the housing, the friction disk means in frictional contact with the housing applies a drag force on the tang portion to urge the key from its retracted state wherein the wedge portion is wholly within the first keyway to its extended state wherein a portion of the wedge portion is in the second keyway and torque is transmitted between the driving and driven members; whereas when the driving member is not rotated in the first direction relative to the housing the driven member can engage the wedge portion to wipe the key into its retracted state thereby eliminating torque transfer between the driving and driven members and allowing bidirectional freewheeling of the driven member relative to the driving member.

2. The clutch of claim 1, wherein the wedge portion of the key floats within and between the first and second keyways, and the tang portion of the key floats within a tang relief formed in the friction disk means.

3. The clutch of claim 1, wherein the driving member is a gear box output shaft and the driven member is a pinion gear.

4. The clutch of claim 1, wherein the wedge portion of the key comprises:
   (a) a relatively thick leading edge which is contained within the first keyway when the key is in its retracted state and which is contained within the second keyway when the key is in its extended state; and
   (b) a relatively thin trailing edge located within the first keyway upon which the key rocks between its retracted and extended states.

5. The clutch of claim 4, wherein the wedge portion leading edge is about ⅛" thick and the wedge portion trailing edge is about 1/16" thick.

6. The clutch of claim 1, wherein the tang portion of the key is attached to one end of the wedge portion and extends substantially perpendicular thereto.

7. The clutch of claim 6, wherein the friction disk means forms an aperture for rotatably receiving the driving member and the friction disk means forms a tang relief for receiving the tang, wherein the tang relief extends radially outward from the friction disk means aperture.

8. A traction drive system for a powered implement having a housing, a prime mover, a prime mover output shaft, and a traction drive wheel assembly, the traction drive system comprising:
   (A) a gear box suitable for pivotally mounting to the housing and comprising an input shaft and a gear box output shaft suitable for coupling to the traction drive wheel assembly;
   (B) a prime mover pulley suitable for mounting on the prime mover output shaft;
   (C) a gear box pulley mounted on the gear box input shaft;
   (D) a belt for interconnecting the pulleys when the gear box is appropriately pivoted relative to the housing; and
   (E) a bidirectional freewheeling clutch suitable for operatively coupling the gear box output shaft and the drive wheel assembly wherein when the gear box is appropriately pivoted and the gear box output shaft is caused to rotate, the clutch is activated by frictional contact with the housing, thereby allowing torque to transfer between the gear box output shaft and the drive wheel assembly, whereas when the gear box output shaft is not rotated there is no appreciable torque transfer between the drive wheel assembly and the gear box output shaft and the drive wheel assembly can freewheel in either direction, wherein the bidirectional freewheeling clutch comprises:
      (1) an internal key having a wedge portion and a tang portion extending therefrom, and a retracted state and an extended state relative to the gear box output shaft; and
      (2) friction disk means concentric to the gear box output shaft and in frictional contact with the housing for receiving the tang portion of the key within a tang relief, wherein:
         (a) the gear box output shaft forms a first axial keyway suitable for wholly receiving the wedge portion of the key when it is in its retracted state and partially receiving the wedge portion of the key when it is in its extended state; and (b) the drive wheel assembly forms a second keyway suitable for partially receiving the wedge portion of the key when it is in its extended state; whereby when the gear box rotates the gear box output shaft in a first direction relative to the housing, the friction disk means in frictional contact with the housing applies a drag force on the tang portion to urge the key from its retracted state wherein the wedge portion is wholly within the first keyway to its extended state wherein a portion of the wedge portion is in the second keyway and torque is transmitted between the gear box output shaft and the drive wheel assembly; whereas when the gear box output shaft is not rotated in the first direction relative to the housing the drive wheel assembly can engage the wedge portion to wipe the key into its retracted state thereby eliminating torque transfer between the gear box output shaft and the drive wheel assemblies and allowing bidirectional freewheeling of the drive wheel assembly relative to the gear box output shaft.

9. The traction drive system of claim 8, wherein the wedge portion of the key floats within and between the first and second keyways, and the tang portion of the key floats within the tang relief.

10. The traction drive system of claim 8, wherein the wedge portion of the key comprises:
(a) a relatively thick leading edge which is contained within the first keyway when the key is in its retracted state and which is contained within the second keyway when the key is in its extended state; and
(b) a relatively thin trailing edge located within the first keyway upon which the key rocks between its retracted and extended states.

11. The traction drive system of claim 10, wherein the wedge portion leading edge is about ⅛" thick and the wedge portion trailing edge is about 1/16" thick.

12. The traction drive system of claim 8, wherein the tang portion of the key is attached to one end of the wedge portion and extends substantially perpendicular thereto.

13. The traction drive system of claim 12, wherein the friction disk means forms an aperture for rotatably receiving the driving member and the tang relief extends radially outward from the friction disk means aperture.

14. A powered implement comprising:
(A) a housing;
(B) a prime mover operatively mounted to the housing;
(C) a traction drive wheel assembly rotatably coupled to the housing for propelling the powered implement along the ground;
(D) a driving member operatively coupled to the prime mover;
(E) a driven member operatively coupled to the traction drive wheel assembly; and
(F) a clutch suitable for operatively coupling the driven member with the driving member, wherein the driven and driving members are configured to rotate relative to the housing, and wherein the clutch comprises:
(1) an internal key having a wedge portion and a tang portion extending therefrom, and a retracted state and an extended state relative to the driving member; and
(2) friction disk means concentric to the driving member and in frictional contact with the housing for operatively engaging the tang portion of the key, wherein:
(a) the driving member forms a first axial keyway suitable for wholly receiving the wedge portion of the key when it is in its retracted state and partially receiving the wedge portion of the key when it is in its extended state; and
(b) the driven member forms a second keyway suitable for partially receiving the wedge portion of the key when it is in its extended state; whereby when the driving member is rotated in a first direction relative to the housing, the friction disk means in frictional contact with the housing applies a drag force on the tang portion to urge the key from its retracted state wherein the wedge portion is wholly within the first keyway to its extended state wherein a portion of the wedge portion is in the second keyway and torque is transmitted between the driving and driven members; whereas when the driving member is not rotated in the first direction relative to the housing the driven member can engage the wedge portion to wipe the key into its retracted state thereby eliminating torque transfer between the driving and driven members and allowing bidirectional freewheeling of the driven member relative to the driving member.

* * * * *